B. F. WHEELOCK.
Sad-Iron Heater.
No. 15,450.
Patented July 29, 1856.
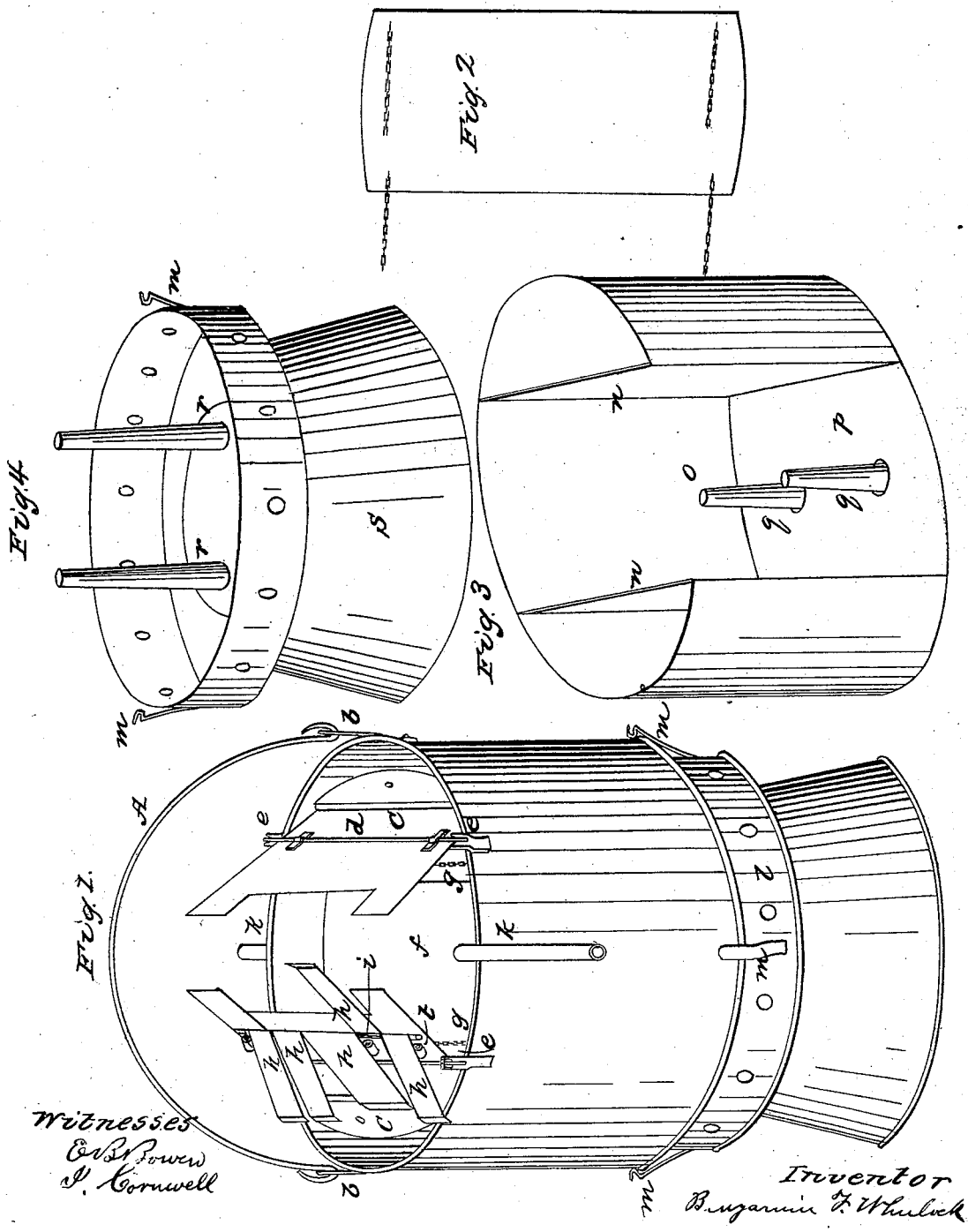

UNITED STATES PATENT OFFICE.

BENJAMIN F. WHEELOCK, OF MAYVILLE, WISCONSIN.

SAD-IRON HEATER.

Specification of Letters Patent No. 15,450, dated July 29, 1856.

*To all whom it may concern:*

Be it known that I, BENJAMIN F. WHEELOCK, of Mayville, in the county of Dodge, in the State of Wisconsin, have invented a new and useful Improvement on the Machine called a "Sad-Iron Heater;" and I do hereby declare that the following is a full, clear, and exact description of the construction and operation of the same, reference being had to the annexed drawings, making a part of this specification.

The nature of my invention consists in providing a balance lid or cover in two parts, with a table for the sad or flat irons to rest upon while heating, attached to the lid a cover, by means of four small chains, instead of springs, and a convenient place for containing the heating fluid in the lower half of the heater.

To enable others skilled in the art to make and use my invention I will proceed to describe its construction and operation.

I construct the heater in two separate parts which are to be used in combination with each other, either of tin, copper, sheet or cast iron, or a part of each material, and is circular in form.

Figure 1 in the accompanying drawing is a perspective view of the heater put together for use, with the top or cover open, and the table thereto, below attached. "A" in Fig. 1, is the handle attached to the upper rim, and on the outside of the heater by means of two ears, "b," "b,"— "C" "C" represent the lid or cover in two halves supported by the small rods "d," "d," fastened to the top thereof, and the ends resting in the open ears "e," "e," "e," attached to each side of the heater and serves to confine the heat in the chamber below. The two outer edges of the lid or cover are made heavier than the inner edges, for the purpose of opening the same when the fastenings are removed, and for the purpose of raising the table "f," upon which the iron rests while heating; and is attached to the under side of the lid or cover by means of four small chains "g" "g" passing through each corner of the table. On the top in the center of the lid, is an opening, in the form of a parallelogram, for the purpose of permitting the handles of the sad iron, while heating, to protrude. The small lids "h," "h," "h," "h," fastened on one side of the lid or cover, by means of the wire hinge "i" are for the purpose of closing that part of the aperture not occupied by the handles of the said iron, which small lids are held down by means of the movable springs fastened by rivets to the top of the cover.

When in use, the sad iron holds down the cover, and when not in use, the cover is held down and fastened by means of movable catches "k," "k," attached to the outside of the machine by rivets—the two parts of the "heater" are connected together by means of a groove at the bottom of the upper part, placed within the rim "l," around the top of the lower part of the heater and made fast by means of the catches "m," fastened to each side of the rim. This rim is perforated with holes, for the purpose of admitting air.

Fig. 2 represents the table upon which the irons rest, while heating, detached from the lid or cover, with the small chains thereto connected.

Fig. 3 represents the inside of the upper part of the heater detached from the lower part, with the top lid or cover removed. Within are placed two parallel upright plates of tin or sheet iron "n" "n" forming the chamber "o" for the purpose of confining the heat within a narrow space and directly under the table. These plates are made to stand upright by means of solder or other convenient fastenings, applied to the inside of the chamber or walls of the heater at the ends of the plates, and are designed to be removed when not in use. The bottom of this chamber "p" is perforated with two holes, through which pass the tubes "q," "q," and within which chamber the material for producing heat is burned.

Fig. 4 represents the bottom of the heater—the perforated rim—into which the upper part of the heater is placed. "r," "r," "r," is the cover and tubes of the lamp and "s" is the chamber for the reception of the heating fluid or material, which is to be alcohol, or other burning fluid or gas.

When I wish to use my heater I separate the two parts thereof, fill the chamber "s" with alcohol or other burning fluid, place the cover and tubes "r," "r," "r," containing suitable wicks, over the aperture of the chamber "s," I then place the two parts of the heater together and fasten them by means of the catches "m." I then adjust the plates "n," "n," in their proper place and light the wicks. I then place the lid or cover "C," "C," therein, and the sad iron on the table "f," which closes by its weight the lid or cover "C" "C." I then close the small lids "h," "h," "h," "h," "h," over that part of the aperture not occupied by the handles of the sad iron, and in a short time my iron is sufficiently heated for use.

I do not claim the particular construction and adaption of the heater to the use of the ordinary flat or sad irons, but What I do claim as new and of my own invention, and desire to secure by Letters Patent of the United States, is—

The use or application of the chains "g," "g," in combination with the table "f," and lids "C," "C," made to balance on the ears "e," "e," "e," in the manner substantially as described for the purposes specified.

BENJAMIN F. WHEELOCK.

Witnesses:
E. B. BOWEN,
S. CORNWELL.